Oct. 4, 1938.  W. P. WHITE  2,132,335
CLOSURE CAP APPLYING APPARATUS
Filed Aug. 9, 1935  2 Sheets-Sheet 1
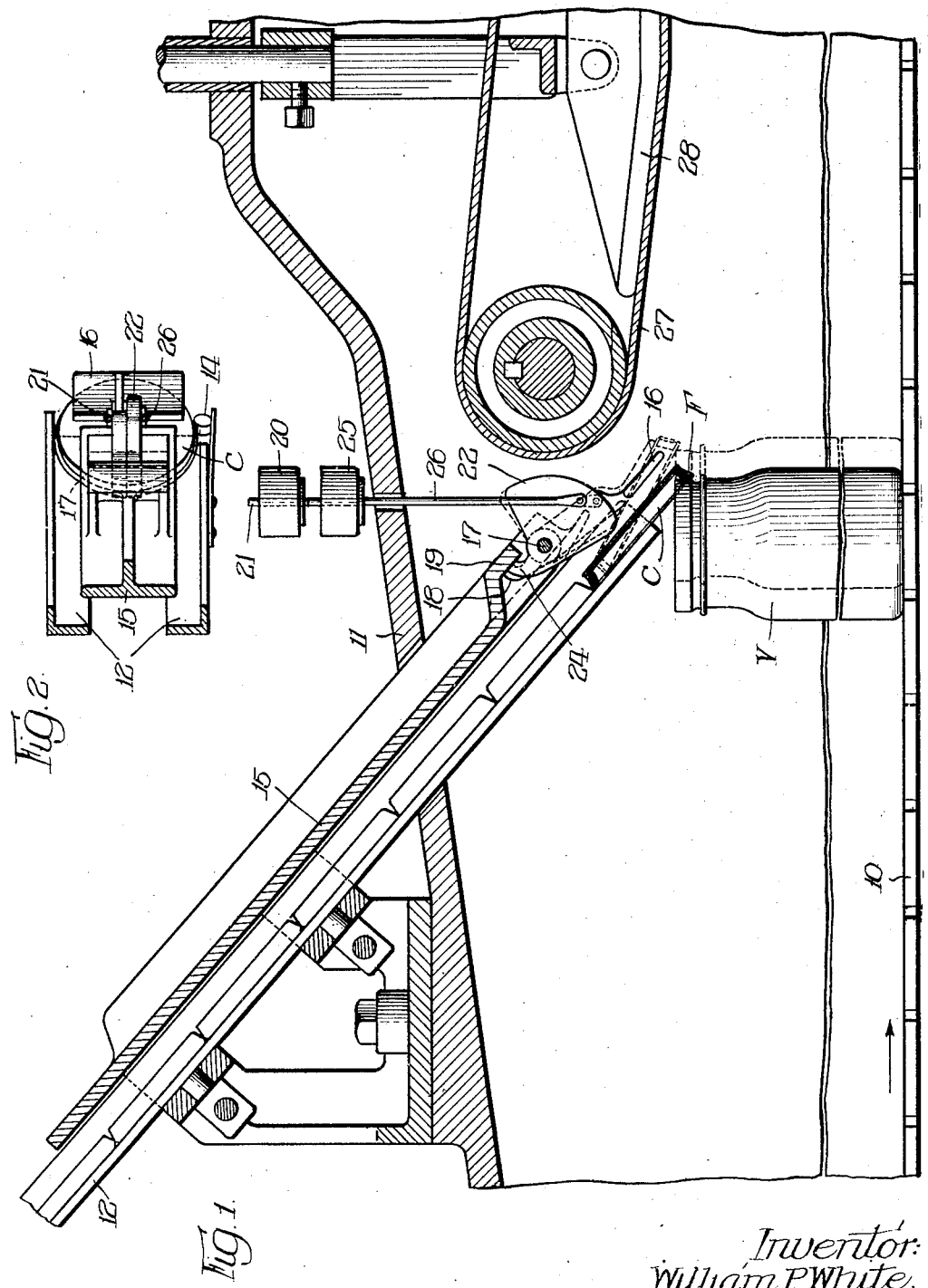
Inventor:
William P. White,
By Cromwell Beistveerden
Attys Oct. 4, 1938.　　　　　W. P. WHITE　　　　　2,132,335
CLOSURE CAP APPLYING APPARATUS
Filed Aug. 9, 1935　　　2 Sheets-Sheet 2
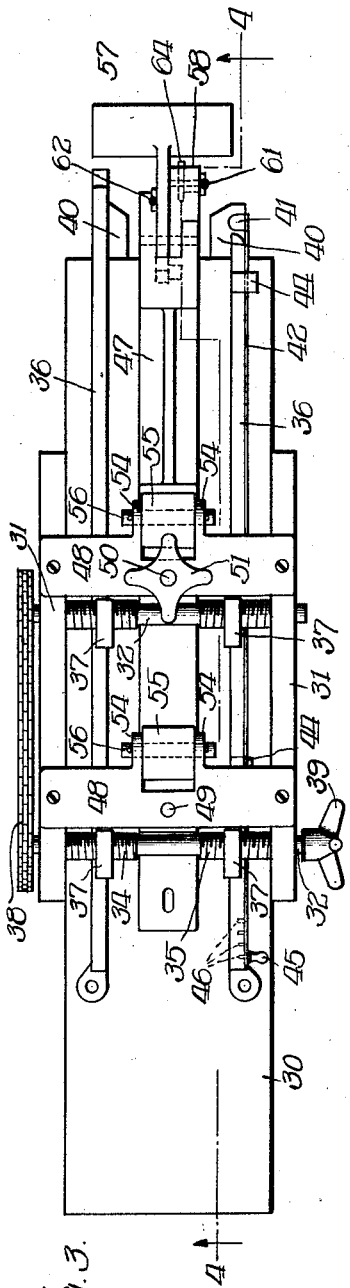
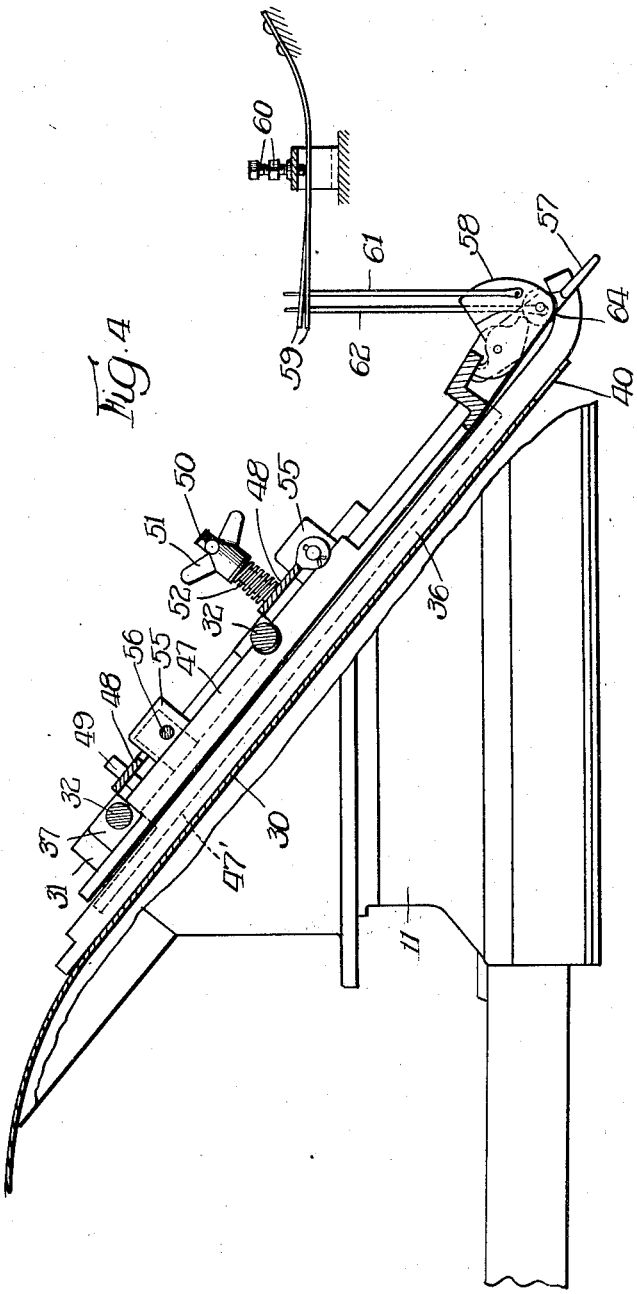
Inventor:
William P. White, Patented Oct. 4, 1938

2,132,335

UNITED STATES PATENT OFFICE 2,132,335

CLOSURE CAP APPLYING APPARATUS

William P. White, Glencoe, Ill., assignor to White Cap Company, Chicago, Ill., a corporation of Delaware Application August 9, 1935, Serial No. 35,453

14 Claims. (Cl. 226—88.1)

This invention relates to packaging and pertains particularly to apparatus for applying closure caps on packing vessels such as cans, bottles, jars, and the like.

A general object of the invention is the provision of improved apparatus for applying closure caps on containers while the latter are moving progressively to a sealing device whereby the applied caps are sealed on the containers.

The present invention is a continuation in part of my copending application Serial No. 654,847, filed February 2, 1933, on which U. S. Patent No. 2,041,891 was granted on May 26, 1936.

A particular object of the invention is the provision of cap-applying apparatus which will operate with certainty to apply the caps to containers incident to movement of the latter progressively at a rapid rate of speed and to accomplish the proper positioning of the caps on the containers so that the subsequent sealing operation may be accomplished quickly and in a comparatively simple manner.

Another object is the provision of such apparatus which is adapted for operation with closure caps of different diameters and different depths.

Other objects will be pointed out or indicated hereinafter or will be apparent to one skilled in the art upon an understanding of the invention or its employment in use.

For the purpose of aiding in an explanation of the invention I illustrate in the drawings forming a part of this specification, and hereinafter described, certain forms of apparatus embodying same; but it is to be understood that these are presented merely by way of example, as the invention may be embodied in other forms. Consequently, the disclosures herein are not to be construed in any fashion calculated to limit the appended claims short of the true and most comprehensive scope of the invention in the art.

In said drawings,

Fig. 1 is a part sectional elevation of sealing apparatus of the form more fully described in my copending application above referred to, same including one embodiment of cap-applying apparatus constituting the subject matter of the present invention;

Fig. 2 is a plan view of a portion of cap-applying apparatus;

Fig. 3 is a plan view of a modified form of cap-applying apparatus embodying the invention; and Fig. 4 is a longitudinal sectional elevation of same on substantially line 4—4 of Fig. 3.

In my above identified copending application and also in my United States Patent No. 1,920,539 are illustrated types of sealing apparatus in which the containers to be capped and sealed are moved progressively in a continuous series, and in the course of such movement air is displaced from the head space of the containers, and the caps applied to and sealed on them. The present improvements are adapted to be embodied in apparatus of that character, although it is not limited to use in that particular character of evacuating and sealing apparatus.

The nature of the improvements constituting the present invention may be most quickly ascertained from the illustrative embodiments shown in the drawings, which will now be described.

The reference numeral 10 designates a portion of an endless-belt type of conveyor or which forms a platform upon which the vessels may be supported in upright position in a series, said conveyor being transmitted in a suitable manner to advance the series of vessels progressively in the direction indicated by the arrow in Fig. 1. Above this conveyor is located a support 11 which may be a casing or housing as illustrated in the above mentioned application and patent, and which support is adjustable vertically toward and from the container 10 for the purpose of adapting the apparatus to vessels of different heights. Mounted on the support 11 is a cap chute which, in the embodiment shown in Figs. 1 and 2, includes a pair of flanged rails 12 extending in sloping direction and adapted to support and guide the caps in single file as they slide downwardly thereon by gravity. These rails are symmetrically adjustable toward and from the longitudinal median line of the machine, in order to accommodate the chute to caps of different diameters. The lower end of the chute is positioned a suitable distance above the conveyor 10 to accommodate passage of the vessels.

At the lower end of the chute is provided a spring-pressed detent 14 which, in the normal position of its spring, lies partly in the path of the caps in the chute, so that it cooperates with the opposite rail to hold the lowermost cap against sliding out of the chute, retaining it therein in a sloping position, with a portion of the cap projecting beyond and below the lower end of the chute. Various forms of flanged or skirted caps may be used such as of the kind illustrated in my United States Patents Nos. 1,590,787 and 1,807,187 and in my copending applications Serial No. 720,365, filed April 13, 1934, and Serial No. 26,978, filed June 17, 1935. Caps of the character described in my last mentioned patents are shown in Figs. 1 and 2, wherein it will be observed that the cap C has an annular skirt or flange F. With the proper vertical adjustment of the support 11 and cap chute for the particular height of containers which are being sealed, the lowermost cap in the chute will thus be held in a position in which its skirt lies in the path of the upper end of the approaching container, so that, with the advancing movement of the container, it will engage the skirt of the cap and withdraw the cap from the chute, camming the detent 14 outwardly to permit the cap to pass from the chute. Upon such withdrawal of the cap from the chute, the cap comes to rest upon and is carried forwardly by the container. The chute includes also a top member 15 extending parallel with and above the rails 12 in a position such that it overlies the caps in the chute. On the lower end of the top member 15, above the lower ends of the rails, a leveling member 16 is hinged at 17 to oscillate upwardly and downwardly, its downward movement being limited by abutment of its heel 18 against the stop 19, so that its lower end will not obstruct the free movement of the cap to the position illustrated in Fig. 2. The lower arm of the leveling member 16 is pressed downwardly by a weight 20 supported on a rod 21 which is pivotally connected to the member 16, the weight being interchangeable so that the loading of the leveling member may be varied in accordance with the sizes or weights of different caps. At its lower end the leveling member is broadened transversely of the chute for the purpose hereinafter explained.

In association with the leveling member 16 there is hinged at 17 a depressor 22, which depends over the lower end of the chute and may oscillate upwardly and downwardly, its downward movement being limited by abutment of its heel 24 against the stop 19. This depressor is also weighted by an interchangeable weight 25 supported on a rod 26 which is pivoted at its lower end to the depressor 22.

As the lowermost cap is engaged and withdrawn from the chute by the container, as above described, its lower or forward side is elevated as illustrated, for example, by the dotted line position in Fig. 1, and its top is raised into engagement with the depressor 22 and leveling member 16. Incident to withdrawal of the cap, the weight of the depressor holds its rearward portion down upon the rails, and prevents the following cap from riding up onto the cap being withdrawn. The weight of the leveling member 16 is at the same time imposed on the cap and is effective to hold the forward portion of its skirt or flange down in engagement with the vessel, thus insuring withdrawal of the cap from the detent, and then retarding its progress so that the withdrawal of the cap from the chute is effected by the pull of the vessel. The broadened forward portion of the leveling member 16 operates, through its pressure, to level the cap transversely on the vessel while its rearward portion slides down the chute and gradually lowers to position on the mouth of the vessel. By virtue of these features the caps are applied accurately and with certainty to the successive vessels incident to progressive movement of the vessels at a rapid rate.

With the caps thus applied to them, the vessels move onwardly under a sealing belt 27, which is held down by a shoe 28, to apply the requisite pressure to the caps to force them to sealed position on the vessels.

In the modified construction illustrated in Figs. 3 and 4, the cap chute includes a bottom plate 30 extending in sloping direction, down which the caps slide in single file. At opposite margins of the plate 30 are affixed cleats 31 in which are rotatably journaled shafts 32, each having oppositely screw-threaded portions 34 and 35. Resting on the plate 30 and movable toward and from each other thereon are cap guide rails 36. These have screw-threaded lug portions 37 meshing with the threaded portions 34 and 35 of the shafts 32. The shafts 32 are connected by a chain and sprocket arrangement 38, and one of them equipped with a hand wheel 39. Consequently, by rotation of the latter, the two shafts 32 will be rotated and the cap rails 36 adjusted symmetrically toward or from each other. This adjustment is to accommodate the apparatus to caps of different diameters. At their lower ends the rails 36 carry inwardly extending ledges 40 which lie flush with the plate 30 and form extensions which support the caps incident to their withdrawal from the chute.

The cap restraining detent 41 is carried on the end of a long flat resilient strip 42, which is supported for longitudinal adjustment in guides 44 carried by one of the rails 36. At its upper end the strip 42 carries a pin 45 adapted to seat in any of a series of holes 46 in the rail 36. By manual engagement of the pin 45, the upper end of the strip 42 may be flexed away from the rail so as to unseat the pin, and then the strip 42 may be adjusted longitudinally to the desired position, in which it is secured by engagement of the pin in the selected hole. This operates to obtain the desired adjustment of the detent 41 longitudinally of the chute, for accommodation of caps of different diameters.

In order to accommodate the cap-applying apparatus to caps of different depths, the top member 47 is adjustable toward and from the plate 30. Bridge members 48 span the chute and are secured to the cleats 31. The top member 47 carries a pin 49 and a screw 50, which are guided by sliding engagement in holes in the bridge members 48. An adjusting nut 51 is threaded on the screw 50 and a coiled spring 52 is interposed between the nut 51 and the bridge member 48. The bridge members carry lugs 54 between which are spacing blocks 55 rotatably held in place by the pins 56. As seen in Fig. 4, the pins 56 are eccentric with respect to the peripheral faces of the blocks 55; that is, each of the four peripheral faces of the respective blocks is at a different perpendicular distance from the pin 56. The blocks 55 are adapted to contact the top surface of the top member 47, and form positioning stops therefor, said top member being held in engagement with the stops by the pressure of spring 52 acting against nut 51 and bridge member 48. Consequently, the chute top member 47 may be maintained at any of selected distances above plate 30, the spacing depending on which side of blocks 55 is faced downwardly in contact with the top member 47. The adjustment is accomplished by slacking off nut 51, rotating blocks 55 to the desired position, and then setting up nut 51 to draw the top member 47 into contact with the blocks. A lower adjusted position of the lower surface of the top member 47 is indicated by dotted line 47' in Fig. 4.

As stated above, this adjustment of the chute top member 47 is for the purpose of accommodating the cap-applying apparatus to caps of different depths. Incident to such adjustment of the chute top member 47 a corresponding adjustment of the cap leveling member 57 and depressor 58 is accomplished. These last mentioned members are hinged on the top member 47 as above described with reference to the leveling member 16 and depressor 22, and they operate in like manner and to like effect. In this embodiment I show them loaded by means of leaf springs 59, which are adjustable by means of screws 60 to vary the loading through the medium of rods 61 and 62. The depressor 58 shown in Figs. 3 and 4 is further modified by being provided with a thin roller 64 which rides upon the tops of the caps incident to their withdrawal from the chute as above described. This is for the purpose of eliminating friction between the depressor and the cap and thus easing the withdrawal of the cap.

It will be observed in both the above described embodiments of the invention that in the course of the withdrawal of a cap from the cap-supporting means the depressor contacts the top of such cap along a comparatively narrow area approximately midway between the chute guide rails or the lateral margins of the cap, whereas the cap leveler, by virtue of its broadened lower end portion, bears on the top of the cap at points spaced a substantial distance laterally from the median line or diameter of the cap. By virtue of this arrangement the cap is quickly and readily leveled transversely by the cap leveling member, the depressor acting to hold the rearward portion of the cap down on the supporting runway, but accommodating such lateral tilting of the cap as may be requisite to permit it to assume a level position under the pressure of the cap leveling device.

What I claim is:

1. Apparatus for applying closure caps to containers, comprising, in combination with conveying means for moving a container progressively, a sloping cap chute down which the caps feed in engagement with one another seriatim, movable detent means for engaging successive caps to control their release from the chute, a yieldably acting depressor arranged to bear upon the rearward portion of the top of the lowermost cap incident to withdrawal thereof from the detent means, thereby to prevent its being over-ridden by the following cap, and a yieldably acting cap leveler arranged to apply downward pressure to the cap after its release from the detent means but while its rearward portion is supported on the cap chute.

2. Apparatus for applying closure caps to containers comprising, in combination, a conveyor for moving a container progressively, cap supporting means for supporting a closure cap in sloping position for engagement by a container advanced by the conveyor, a yieldably acting depressor arranged to apply downward pressure to a cap to hold its rear end down on the cap-supporting means incident to withdrawal of the cap therefrom, and a yieldably acting cap leveler arranged a substantial distance beyond the depressor so that it will apply downward pressure to a forward portion of the cap when the rear portion of the cap is supported on the cap-supporting means.

3. Apparatus as specified in claim 2 and wherein the depressor is arranged to have a relatively narrow bearing on the top of the cap approximately midway between its lateral margins and the cap leveler is arranged to have bearing contact with the top of the cap at opposite points spaced a substantial distance laterally from its median line.

4. Apparatus as specified in claim 2 and including means for varying the pressure exerted on the cap by the depressor and the cap leveler.

5. Apparatus as specified in claim 2 and including a mounting for the depressor and cap leveler, which mounting is adjustable to vary the relationship of the depressor and cap leveler to the cap-supporting means, for cooperation with caps of different heights.

6. In apparatus for applying closure caps to containers, in combination, a runway upon which caps may slide one after another, a top member over said runway and movable toward and from same to vary the space for caps therebetween, positioning members adjustable relative to the runway and top member, and means for holding said top member against said positioning members.

7. Apparatus as specified in claim 6 and wherein said positioning members comprise rotatable elements having peripheral portions at different distances from their axes for engagement with said top member.

8. Apparatus as specified in claim 6 and wherein said positioning members comprise rotatable polyhedral elements having peripheral sides at different perpendicular distances from their axes for engagement with said top member.

9. Apparatus as specified in claim 6 and including bridge members spanning the runway and supporting the positioning members.

10. In apparatus for applying closure caps to containers, in combination, a runway upon which caps may slide one after another, guide rails extending lengthwise said runway and adjustable toward and from each other, a bridge member fixed to the runway and spanning the same above the guide rails, and a top member supported on said bridge member over the runway and extending lengthwise thereof and adjustable toward and from the same.

11. In apparatus for applying closure caps to containers, in combination, a runway upon which caps may slide one after another, guide rails above said runway and extending lengthwise of the same and beyond the end thereof and adjustable toward and from each other for cooperation with caps of different widths, and wings carried by and extending laterally inward from said rails at the end of the runway with their upper surfaces flush with the upper surface of the same to form cap-supporting extensions therefrom.

12. In apparatus for applying closure caps to containers, in combination, a runway upon which caps may slide one after another, a guide rail extending longitudinally of said runway, a resilient strip supported on said guide rail and adjustable longitudinally thereof, a detent carried by said resilient strip and jutting inwardly over the runway at the end of said rail, and means for retaining the adjustable strip in selected position to establish the position of the detent longitudinally of the runway.

13. Apparatus for applying closure caps to containers comprising, in combination, a runway for supporting closure caps and along which they may slide, a top member spaced above the runway to afford a passage for caps therebetween, said top member being adjustable toward and from the runway to selective fixed positions to vary the height of said cap passage, and a cap depressor movably mounted on said top member adjacent the end of the runway and having a contact portion within the runway adapted to apply yielding pressure downwardly on the rearward portion of a cap supported on the runway therebelow.

14. Apparatus for applying closure caps to containers comprising, in combination, a sloping runway down which closure caps may slide, a depressor arranged above the lower end of the runway in position to apply yieldable downward pressure on the rearward portion of a cap which is partly supported on the runway, and a cap leveler disposed beyond the lower end of the runway in position to exert yielding downward pressure on a portion of the cap beyond the runway while the rearward portion of such cap is supported on the runway.

WILLIAM P. WHITE.